(12) United States Patent
Sellin et al.

(10) Patent No.: US 6,207,128 B1
(45) Date of Patent: *Mar. 27, 2001

(54) METHOD OF PRODUCING A CATALYST

(75) Inventors: Annicka Sellin, Göteborg; Mats Nyström, Ytterby, both of (SE)

(73) Assignee: AKZO Nobel N.V., Arnhem (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,017

(22) Filed: Apr. 30, 1998

Related U.S. Application Data

(60) Provisional application No. 60/052,735, filed on Jul. 8, 1997.

(30) Foreign Application Priority Data

May 5, 1997 (EP) .................................... 97850074

(51) Int. Cl.[7] .......................... C01B 15/023; B01J 23/44; B01J 21/08; B01J 21/18
(52) U.S. Cl. .......................... 423/588; 502/174; 502/177; 502/178; 502/182; 502/183; 502/185; 502/240; 502/242; 502/251; 502/252; 502/262; 502/263; 502/300; 502/328; 502/333; 502/339; 502/340; 502/341; 502/349; 502/350; 502/351; 502/355
(58) Field of Search .................................... 502/300, 339, 502/240, 242, 251, 252, 262, 263, 174, 177, 178, 182, 183, 185, 328, 333, 340, 341, 349, 350, 351, 355; 423/588

(56) References Cited

U.S. PATENT DOCUMENTS

| | | |
|---|---|---|
| 3,009,782 | 11/1961 | Porter . |
| 4,048,096 * | 9/1977 | Bissot . |
| 4,061,598 | 12/1977 | Makar . |
| 4,240,933 | 12/1980 | Copelin . |
| 4,258,025 * | 3/1981 | Copelin ................. 423/588 |
| 4,374,047 | 2/1983 | Bozon et al. . |
| 4,521,531 | 6/1985 | Coates . |
| 4,552,748 | 11/1985 | Berglin et al. . |
| 4,800,073 | 1/1989 | Bengtsson et al. . |
| 4,800,074 | 1/1989 | Bengtsson et al. . |
| 4,800,075 * | 1/1989 | Jenkins ................. 423/588 |
| 5,063,043 | 11/1991 | Bengtsson . |
| 5,071,634 | 12/1991 | Maunula et al. . |
| 5,435,985 | 7/1995 | Pukkinen et al. . |
| 5,505,921 * | 4/1996 | Luckoff et al. .............. 423/584 |
| 5,772,977 * | 6/1998 | Jenkins et al. .............. 423/588 |

FOREIGN PATENT DOCUMENTS

| | | | |
|---|---|---|---|
| 1188288 | 6/1985 | (CA) | .................. 252/84 |
| 1309079 | 10/1992 | (CA) | .................. 252/1 |
| 0 009 802 | 10/1979 | (EP) | . |
| 0 621 235 | 4/1994 | (EP) | . |
| 718306 | 11/1954 | (GB) | . |
| 993979 | 6/1965 | (GB) | . |
| 1833204 | 4/1991 | (SU) | . |

OTHER PUBLICATIONS

"Metallic Coating of Plastics", W. Goldie, Electrochemical Publications Limited 1969, p 39–52, 55–58, & 99–110.

"Modern Electroplating", F. A. Lowenheim, John Wiliey & Sons, Inc. 1974, pp. 710–711 & 738–745.

"Thin Film Processes", J. L. Vossen et al., Academic Press 1978, pp. 212–221.

"A Novel Fixed Bed Catalyst for the Direct Combination of $H_2$ and $O_2$ to $H_2O_2$" J. R. Kosak, Chem. Ind., (Dekker), 1995, vol. 62, pp 115–125.

\* cited by examiner

*Primary Examiner*—Wayne Langel
(74) *Attorney, Agent, or Firm*—David J. Serbin

(57) ABSTRACT

The invention relates to a method of producing a catalyst comprising a porous support and a catalytically active metal deposited thereon comprising the steps of treating the porous support with a solution of a salt of the catalytically active metal and a reducing agent to achieve electroless deposition of the catalytically active metal on the support. The invention also relates to a catalyst obtainable by the method and a process of producing hydrogen peroxide.

12 Claims, No Drawings

METHOD OF PRODUCING A CATALYST

This application claims the benefit of Provisional No. 60/052,735 filed Jul. 8, 1997.

The present invention relates to a method of producing a catalyst comprising a porous support and a catalytically active metal deposited thereon. The method involves electroless deposition of the active metal on the support. The invention also relates to a catalyst obtainable by the method and a process of producing hydrogen peroxide.

Catalysts made of a porous support and a catalytically active metal deposited thereon are used in numerous chemical processes. A porous support involves the advantage of achieving a high specific surface area and efficient utilisation of the active metal. Such a catalyst can, for example, be used for hydrogenation of alkylated anthraquinones in the anthraquinone process of producing hydrogen peroxide or for production of hydrogen peroxide by direct reaction between hydrogen and oxygen.

In the anthraquinone process of producing hydrogen peroxide alkylated anthraquinones dissolved in suitable organic solvents, a so called working solution, are treated with hydrogen in the presence of a catalyst to form the corresponding hydroquinones. The hydroquinones are then oxidised to quinones with oxygen (usually air) with simultaneous formation of hydrogen peroxide which is extracted with water while the quinones are returned with the working solution to the hydrogenation step.

The hydrogenation is the most important step in modem hydrogen peroxide production and different methods of performing this step efficiently are described in the literature. For example, U.S. Pat. No. 3,009,782 discloses use of a fixed bed of catalyst particles, U.S. Pat. Nos. 4,552,748 and 5,063,043 disclose use of a monolithic fixed bed catalyst, and U.S. Pat. No. 5,071,634 discloses use of a catalyst coated static mixer.

In most cases the catalytically active metals are precious metals such as platinum or palladium. The catalysts are normally produced by impregnating a porous support with a solution of a salt of the metal and then treating the impregnated support with a reducing agent such as hydrogen gas. Such processes are described in, for example, U.S. Pat. No. 4,521,531, U.S. Pat. No. 4,240,933 and GB 933979. Although the efficiency of prior art catalysts normally is acceptable, there is always a demand for catalysts having improved activity. As chemical processes like hydrogen peroxide production are performed in large scale even a small enhancement of the catalyst activity can be crucial for the economy of the process.

Many metals can be deposited on various surfaces by electroless or autocatalytic deposition which is described in, for example, W. Goldie, "Metallic Coating of Plastic, Electrochemical Publications Ltd 1969, p 39–52, 55–58, 99–110; F. A. Lowenheim, "Modern Electroplating, John Wiliey & Sons, inc. 1974, p 710–711, 738–745; and J. L Vossen, W. Kern, "Thin Film Processes, Academic Press 1978, p 212–221.

J. R. Kosak (DuPont), "A Novel Fixed Bed Catalyst for the Direct Combination of $H_2$ and $O_2$ to $H_2O_2$", Chem. Ind. (Dekker), 1995, Vol., p 115–125, 62, Catalysis of Organic Reactions, describes preparation of a catalyst by electroless deposition of palladium on a base metal support.

The present invention intends to solve the problem of providing an improved catalyst comprising a porous support and a catalytically active metal deposited thereon. It is also an object of the intention to provide an improved process of producing hydrogen peroxide. According to the invention it has surprisingly been found that the activity of a metal catalyst on a porous support is significantly increased if the catalytically active metal is deposited thereon by electroless deposition.

Electroless deposition refer to methods of depositing metals on catalytic surfaces by the action of a chemical reducing agent in a solution to reduce metallic ions to metal, i.e. autocatalytic deposition.

Thus, the invention concerns a method of preparing a catalyst comprising a porous support and a catalytically active metal deposited thereon comprising the step of treating the porous support with a preferably aqueous solution of a salt of the catalytically active metal and a reducing agent to achieve electroless deposition of the catalytically active metal on the support. Thus, a salt of the catalytically active metal and a reducing agent appear in the same solution during the deposition.

The catalytically active metal may, for example, be any of nickel, palladium, platinum, rhodium, ruthenium, gold, silver, or mixtures thereof. Preferred metals are nickel, palladium, platinum and gold, of which palladium or mixtures comprising at least 50 wt % palladium are particularly preferred. Any water soluble salt of the catalytically active metal can be used. Examples of useful salts are chlorides and nitrates such as $PdCl_2$, $(NH_3)_4PdCl_2$, $H_2PtCl_6$ and $Pd(NO_3)_2$.

The porous support may be in the form of discrete particles or fiber cloth or, which is particularly preferred, be arranged in the form of a monolithic structure which, for example, may form substantially parallel channels coated with the support or a static mixer. A monolithic structure may be made of the porous support as such or of another material such as ceramic, metallic or polymeric materials or glass which has been coated with a porous support. Suitable materials for a porous support may, for example, be silica, silicate, alumina, carbon, aluminium silicate such as zeolite, carbonates of alkaline earth metals such as magnesium, calcium, barium or strontium, oxides of magnesium, aluminium, titanium or zirconium, or carbides of magnesium, silicon, aluminium, titanium or zirconium. Silica and alumina are particularly preferred. Preferably the support has a specific surface area from about 0.3 to about 500 $m^2/g$, most preferably from about 1 to about 200 $m^2/g$, particularly from about 10 to about 100 $m^2/g$.

The reducing agent may, for example, be any of formic acid, formaldehyde, hydrazine, salts of hypophosphite or borohydride, or derivatives thereof, or a reducing gas such as hydrogen. Preferred reducing agents are salts of hypophosphite, particularly alkali metal salts such as sodium hypophosphite.

The solution of the salt of the catalytically active metal preferably also contains additional substances, such as stabilisers, particularly complexing agents such as ammoniac or derivatives thereof like ammonium chloride, EDTA, DTPA, or mixtures thereof, of which ammoniac and ammonium chloride are particularly preferred. It is advantageous if the solution contains a sufficient amount of stabilizers to avoid spontaneous precipitation of the catalytically active metal.

The treatment can be performed by contacting the porous support with a solution containing the salt of the catalytically active metal, the reducing agent and any other optional ingredients such as stabilisers, for example by immersing the support into the solution or pumping the solution through a body of a support for a time sufficient to achieve electroless deposition of a desired amount of the metal thereon which normally is from about 0.1 to about 10 g catalytically active metal per 100 g of the support. Normally a suitable contact time is from about 30 seconds to about 2 hours, preferably from about 1 to about 60 minutes. A longer contact time is not detrimental but does not involve any significant advantages. The temperature is not critical and may for example be from the freezing point to the boiling point of the solution, preferably from about 5 to about 70° C. The concentration of the solution is not critical and may, for instance, be from about 0.0001 g catalytically active metal/liter solution up to saturation, for example up to about 50 g metal/liter or more. The amount of reducing agent is suitably sufficient for precipitating substantially all the catalytically active metal onto the support. Preferably the reducing agent is added in stochiometric excess and the solution in contact with the support may, for instance, contain up to 100 g/liter or more of the reducing agent, although it is preferred to maintain a concentration below about 50 g/liter for avoiding spontaneous precipitation of the catalytically active metal in the solution. It can be appropriate to arrange for good agitation, for example with a mechanical agitator, by providing forced circulation of the solution, or by blowing gas, e.g. nitrogen or another inert gas, through the solution which also involves the advantage of removing oxygen from the solution. It is possible to reuse the solution and just add make up amounts of the reducing agent and the salt of the catalytically active metal.

A preferred procedure involves the steps of first contacting the porous support with a solution containing the salt of the catalytically active metal, then adding the reducing agent to the solution and finally maintaining the support in contact with said solution for a time sufficient to achieve electroless deposition of a desired amount of the metal. Another preferred procedure involves the steps of first contacting the porous support with the reducing agent, preferably in an aqueous solution optionally containing one or more of the above mentioned additional substances such as stabilizers, then adding a solution containing the salt of the catalytically active metal, and finally maintaining the support in contact with said solution for a time sufficient to achieve electroless deposition of a desired amount of the metal. Still another preferred procedure involves the steps of contacting the porous support with a solution already containing both the salt of the catalytically active metal and the reducing agent, and finally maintaining the support in contact with said solution for a time sufficient to achieve electroless deposition of a desired amount of the metal.

Preferably the method of the invention further comprises the steps of activating the porous support to absorb a catalyst for electroless deposition, and then treating the activated support with a preferably aqueous solution of a salt of the catalytically active metal and a reducing agent to achieve electroless deposition of the catalytically active metal thereon. The activation is normally advisable if the support has no catalytic properties which is the case for most non-metals.

The catalyst for electroless deposition is normally a metal and may, for example, be any of aluminium, chromium, cobalt, gold, iron, molybdenum, nickel, palladium, platinum, rhodium, ruthenium, silver, steel, tin or tungsten, or mixtures thereof. Preferred catalysts for electroless deposition are palladium, platinum, gold or mixtures thereof, of which palladium is particularly preferred. It is also preferred to use the same metal or mixture of metals as the catalytically active metal to be deposited.

Preferably, the activation comprises the steps of first treating the porous support with a preferably aqueous solution of a sensitizer capable of acting as a reductant and then with a preferably aqueous solution of a salt of the catalyst for electroless deposition to achieve formation of a thin layer of said catalyst on the support. Suitably these steps are carried out separately, and the treatment with the sensitizer is preferably followed by a washing or rinsing step, for example with water, before the sensitized support is contacted with the solution of the salt of the catalyst. The treatments can be performed with conventional methods such as immersion (preferably under agitation), pumping solution through a body of a porous support, spraying, etc. The concentration of the solutions is not critical. The solution of the sensitizer may, for instance, contain from about 0.01 g/liter up to saturation, for example up to about 100 g/liter or more, while the solution of the salt of the catalyst for electroless deposition may contain from about 0.0001 g metal/liter up to saturation, for example up to about 50 g/liter of more. Suitable treatment time for each step is preferably from about 5 seconds to about 60 minutes, most preferably from about 1 to about 10 minutes. A longer treatment time is not detrimental but does not involve any significant advantages. The temperature may, for example, be from the freezing point to the boiling point of the respective solution, preferably from about 5 to about 70° C. The same solution can be used several times after addition of make up chemicals.

Although it is possible to achieve activation without treatment with the sensitizer, it is then normally necessary to perform the electroless deposition at a higher temperature and it has also been found that the final catalyst obtained has a lower activity than those catalysts obtained in preparation methods including treatment with a sentisizer If the catalyst for electroless deposition is the same metal or mixture of metals as the catalytically active metal finally deposited, it is possible to use the same solution in the activation as in the electroless deposition. For example, it is then possible to add the reducing agent to the activation solution while it still is in contact with the support.

The sensitizer can, for example, be stannous compounds, silver nitrate, titanium salts, hypophosphite salts or formaldehyde. Preferred sensitizers are stannous compounds such as chloride, fluoroborate, sulphate or stannite, of which stannous chloride is particularly preferred. The solution of the sensitizer preferably also contains an acid, most preferably hydrochloric acid.

Accordingly, a particularly preferred method of preparing a catalyst comprises the steps of:

(a) treating a porous support with a preferably aqueous solution of a sensitizer capable of acting as a reductant;

(b) washing the support from step (a), preferably with water;

(c) treating the support from step (b) with a preferably aqueous solution of a salt of a catalyst for electroless deposition to achieve formation of a thin layer of said catalyst;

(d) contacting the support from step (c) with a solution of a salt of a catalytically active metal preferably also containing one or more stabilisers such as ammoniac and/or ammonium chloride; and (e) adding a reducing agent to the solution in step (d) to achieve electroless deposition of the catalytically active metal on the porous support, wherein the reducing agent preferably is added in excess to deposit substantially all the catalytically active metal onto the support.

Alternatively, steps (d) and (e) can be performed in the opposite order or simultaneously by contacting the support with a solution containing both a catalytically active metal and a reducing agent.

The invention also concerns a catalyst comprising a porous support and a catalytically active metal deposited thereon obtainable by electroless deposition of the active metal on the support according to the method described above. Compared to catalysts produced by conventional impregnation methods, catalysts according to invention show higher activity, especially for hydrogenation and particularly for hydrogenation of anthraquinones and derivatives thereof, but also for production of hydrogen peroxide by direct reaction between hydrogen and oxygen. It has also been found that the catalytically active metal in catalysts of the invention is not uniformly distributed throughout the porous support but is mainly localised to the outer surface thereof which might be one explanation of the unexpected high activity. Regarding further features of the catalyst, the above description of its preparation is referred to.

The invention also concerns a process of producing hydrogen peroxide according to the anthraquinone process involving alternate oxidation and hydrogenation of anthraquinones or derivatives thereof in a working solution of organic solvents in the presence of a catalyst according to the above description.

The hydrogenation is suitably performed at a temperature from about 0 to about 100° C., preferably from about 40 to about 70° C., and at a pressure from about 10 to about 1500 kPa, preferably from about 200 to about 600 kPa. Preferably alkylated anthraquinones such as 2-alkyl-9,10-anthraquinones are used. Examples of useful alkyl-anthraquinones are 2-ethylanthraquione, 2-tert-butylanthraquione, 2-hexenylanthraquione, eutectic mixtures of alkylanthraquiones, mixtures of 2-amylanthraquiones, and their tetra-hydro derivatives. The working solution suitably comprises one or more quinone solvents and one or more hydroquinone solvents. Suitable quinone solvents may include aromatic, aliphatic or naphtenic hydrocarbons, for example benzene, alkylated or polyalkylated benzenes such as tert-butylbenzene or trimethyl benzene, alkylated toluene or naphthalene such as tert-butyltoluene or methylnaphthalene. Suitable hydroquinone solvents may include alkyl phosphates, alkyl phosphonates, nonyl alcohols, alkylcyclohexanol esters, N,N, dialkyl carbonamides, tetraalkyl ureas, N-alkyl-2-pyrrolidones. Particularly preferred hydroquinone solvents are described in the U.S. Pat. Nos. 4,800,073 and 4,800,074 and include alkyl-substituted caprolactams and cyclic urea derivatives such as N,N'-dialkylsubstituted alkylenurea.

The invention further concerns a process of producing hydrogen peroxide by direct reaction of hydrogen and oxygen in the presence of a catalyst according to the above description. The process is suitably carried out by continuously feeding hydrogen and oxygen in gas form to a pressurised reaction vessel containing a slurry of catalyst particles in a preferably aqueous reaction medium. The oxygen may be supplied as substantially pure gas or in the form of an oxygen containing gas such as air. The gas phase in the reactor suitably contains an excess of oxygen, for example from almost 0 to about 25 mol %. The reaction is favoured by a high content of hydrogen, suitably above about 0.1 mol %, preferably above about 1 mol %, but for safety reasons it is preferred not to exceed the detonation limit at about 19 mol % and most preferred not to exceed the explosion limit at about 5 mol %. The reaction medium is suitably acidic and does preferably contain from about 0.01 to about 1 moles/liter of free hydrogen ions, most preferably from about 0.02 to about 0.2 moles/liter of free hydrogen ions. The acid may for example be supplied in the form of sulfuric acid, phosphorous acid or perchloric acid which preferably is present in an amount from about 0.01 to about 1 mole/liter, most preferably from about 0.02 to about 0.2 moles/liter. Further, the reaction medium also suitably contains one or several halide ions such as bromide, chloride, or iodide, of which bromide being particularly preferred. The halogenide is preferably present in an amount from about 1 to about 1000 ppm by weight, most preferably from about 2 to about 100 ppm by weight, and may be supplied in the form of alkali metal salts such as sodium, potassium or mixtures thereof or as the corresponding acids. The pressure is suitably maintained from about 10 to about 200 bars, preferably from about 30 to about 100 bars, while the temperature suitably is maintained from about 0 to about 100° C., preferably from about 20 to about 70° C. In order to achieve sufficient mass transport it is preferred that the reaction medium is agitated or pumped around, or that the gas is injected in the bottom of the reaction vessel. The hydrogen peroxide formed dissolves in the reaction medium which continuously is withdrawn from the reaction vessel through a filter on which the catalyst is retained. The hydrogen peroxide can be separated from the reaction medium with conventional unit operations such as evaporation, distillation or combinations thereof. The reaction medium can then be recycled to the reaction vessel, optionally after addition of make up chemicals such as sulfuric acid, alkali metal bromide etc.

Regarding suitable and preferred catalysts, the above description of the catalyst and the method of its preparation is referred to.

Further details regarding hydrogen peroxide production as such appear in the patents cited herein, particularly U.S. Pat. No. 4,552,748 and U.S. Pat. No. 4,800,074.

The invention is further described through the following example. If nothing else is stated, all contents and percentages are based on the weight.

EXAMPLE

A catalyst according to the invention was prepared by deposition palladium on a monolithic porous silica support comprising channels with a total volume of 0.1 liter as described below.

The following aqueous solutions were prepared:

(a) 4.67 g HCl, 95.43 g water and 1,192 g $SnCl_2*2H_2O$ (s) were mixed.

(b) 3,75 ml acidic aqueous $PdCl_2$ solution (7 g Pd/l), 0.4 g HCl and water to a volume of 100 ml were mixed.

(c) 18.85 g $NH_3$ and 6.76 g $NH_4Cl$ (s) were dissolved in 121.26 g water. This solution was mixed with an acidic aqueous solution of $PdCl_2$ (7 g Pd/l) and the resulting solution was allowed to stand overnight.

(d) 3.08 g $NaH_2PO_2*2H_2O$ and 44.7 g water were mixed. Then the following steps were performed:

(1) Sensitizing: The monolithic support was immersed in solution (a) for 2 minutes and was then washed with 4×250 ml water.

(2) Activation: The sensitized support was immersed in solution (b) for 2 minutes.

(3) Electroless deposition: The activated support was immersed in solution (c), whereupon solution (d) was added slowly. After 45 minutes the support, which had become black, was taken out and was washed in an acidic aqueous solution for 10 minutes. Then it was allowed to dry in 50° C. over night.

The prepared catalyst was used for hydrogenation of alkyl anthraquinone and the activity was measured and compared with a Reference catalyst prepared by impregnating the support with a palladium salt followed by reduction in hydrogen atmosphere. The results are shown in the table below.

| Age | Activity (%) | |
|---|---|---|
| (days) | Reference | Invention |
| 1 | 100 | 122 |
| 2 | 100 | 125 |
| 5 | 100 | 126 |
| 8 | 100 | 133 |
| 9 | 100 | 131 |
| 14 | 100 | 132 |
| 16 | 100 | 135 |

It appears that the catalyst of the invention has significantly higher activity than the Reference catalyst, both as new and after 16 days of operation.

What is claimed is:

1. A process of producing hydrogen peroxide according to the anthraquinone process involving alternate oxidation and hydrogenation of anthraquinones or derivatives thereof in working solution of organic solvents in the presence of a catalyst, wherein the catalyst comprises a porous support and at least one catalytically active metal deposited thereon by electroless deposition, the electroless deposition including the steps of activating the porous support to absorb a catalyst for electroless deposition, and then treating the porous support with a solution of a salt of the at least one catalytically active metal and a reducing agent to achieve electroless deposition of the catalytically active metal on the support, wherein the activation comprises the steps of first treating the porous support with a solution of a sensitizer capable of acting as a reductant and then with a solution of a salt of the catalyst for electroless deposition to achieve formation of a thin layer of said catalyst on the support.

2. A process as claimed in claim 1, wherein the at least one catalytically active metal is palladium or a mixture comprising at least 50 weight % palladium.

3. A method as claimed in claim 1, wherein the solution of the salt of the at least one catalytically active metal further includes ammonium chloride, ammoniac or a mixture thereof.

4. A method as claimed in claim 1, wherein the reducing agent is an alkali metal hypophosphite.

5. A method as claimed in claim 1, wherein the sensitizer is a stannous compound.

6. A method as claimed in claim 1, wherein the porous support is made of a material selected from the group consisting of silica, silicate, alumina, carbon, a carbonate of alkaline earth metal including magnesium, calcium, barium, or strontium, an oxide of magnesium, aluminum, titanium, or zirconium, a carbide of magnesium, silicon, aluminum, titanium, or zirconium, and mixtures thereof.

7. A catalyst comprising a porous support and at least one catalytically active metal deposited thereon by electroless deposition, the electroless deposition including the steps of (a) activating the porous support to absorb a catalyst for electroless deposition, said activating step including first treating the porous support with a solution of a sensitizer capable of acting as a reductant, followed by a solution of a salt of the catalyst for electroless deposition to achieve formation of a thin layer of said electroless deposition catalyst on the support, and (b) treating the porous support with a solution of a salt of the at least one catalytically active metal and a reducing agent to achieve electroless deposition of the catalytically active metal on the support.

8. A catalyst as claimed in claim 7, wherein the at least one catalytically active metal is palladium or a mixture of active metals comprising at least 50 weight % palladium.

9. A catalyst as claimed in claim 7, wherein the solution of the salt of the at least one catalytically active metal further contains ammonium chloride or ammoniac or a mixture thereof.

10. A catalyst as claimed in claim 7, wherein the reducing agent is an alkali metal hypophosphite.

11. catalyst as claimed in claim 7, wherein the sensitizer is a stannous compound.

12. A catalyst as claimed in claim 7, wherein the porous support is made of a material selected from the group consisting of silica, silicate, alumina, carbon, carbonate of alkaline earth metal including one or more of magnesium, calcium, barium or strontium, an oxide of magnesium, aluminum, titanium, or zirconium, a carbide of magnesium, silicon, aluminum, titanium, or zirconium, and mixtures thereof.

* * * * *